Patented Feb. 23, 1965

3,170,923
17-TETRAHYDROPYRANYLETHERS OF Δ⁴,⁶-ANDROSTADIENES
Alexander D. Cross, Mexico City, Mexico, assignor to Syntex Corporation, Panama, Panama, a corporation of Panama
No Drawing. Filed Nov. 12, 1963, Ser. No. 323,122
Claims priority, application Mexico, Feb. 28, 1963, 71,076
3 Claims. (Cl. 260—239.55)

This invention relates to novel cyclopentanopolyhydrophenanthrene derivatives and to processes for the preparation thereof.

More particularly, this invention relates to novel 17-tetrahydropyranylethers of $\Delta^{4,6}$-androstadienes and 19-nor-$\Delta^{4,6}$-androstadienes represented by the general formula:

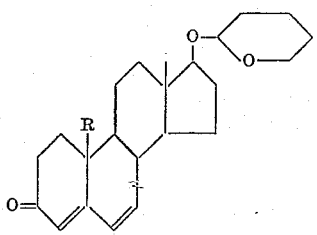

wherein R represents hydrogen or methyl.

A considerable amount of research in the steroid field has been done in the area of anabolic agents, inasmuch as such compounds are useful in many areas of human and veterinary medicine. Thus, for example, an important application of anabolic agents in human therapy is in cases where the patient suffers from any of a number of debilitating diseases or conditions which produce a negative nitrogen balance, such as deficient nutritions or growth, chronic cachetic diseases, and osteoporosis, wherein it is necessary to increase the metabolism of proteins and obtain a positive nitrogen balance and greater deposition of calcium in bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally, and that this is particularly the case with 17α-alkyl substituted derivatives such as 17α-methyltestosterone, 6α,17α - dimethyltestosterone, 2 - hydroxymethylene-17α-methyldihydroallotestosterone, 2α,17α-dimethyldihydroallotestosterone, and the like. However, it is also known that androstane derivatives of the type in question which do not have a 17α-alkyl substituent exhibit either very low anabolic activity or no anabolic activity at all when administered orally.

The present invention is based on the surprising and unexpected discovery that the $\Delta^{4,6}$-androstadiene and 19-nor-$\Delta^{4,6}$-androstadiene-17-tetrahydropyranyl ethers represented by the above general formula, unlike the corresponding 17-unetherified compounds, exhibit good anabolic activity when administered orally. In addition, the androgenic activity of these 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic activity, lower blood cholesterol levels, and inhibit the secretion of gonadotrophins by the pituitary gland.

The $\Delta^{4,6}$-androstadiene and 19-nor-$\Delta^{4,6}$-androstadiene 17-tetrahydropyranyl ethers of the present invention are obtained from the corresponding 17β-hydroxy steroids by conventional methods of preparing tetrahydropyranyl ethers of steroids having free hydroxyl groups. Thus, the free 17β-hydroxyl-containing parent compound can be reacted under substantially anhydrous conditions, with an excess of dihydropyran in the presence of a small amount of an acidic catalysts, e.g., hydrochloric acid, p-toluenesulfonic acid, boron trifluoride etherate, and the like, either alone or together with an inert organic solvent, such as benzene, diethyl ether, or the like, at a temperature of from about 0° C. to about 50° C., and preferably at room temperature (about 25° C.) for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following example is set forth. This example is given solely for the purpose of illustrating the invention, and should not be considered as expressing limitations unless so set forth in the appeneded claims.

*Example*

To a solution of 1 gram of 6-dehydrotestosterone ($\Delta^{4,6}$-androstadien-17β-ol-3-one) in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of $\Delta^{4,6}$-androstadien-17β-ol-3-one.

By repeating this procedure in every detail but one, namely, replacing 6-dehydrotestosterone with 19-nor-6-dehydrotestosterone (19 - nor - $\Delta^{4,6}$-androstadien-17β-ol-3-one), the 17-tetrahydropyranyl ether of 19-nor-$\Delta^{4,6}$-androstadien-17β-ol-3-one was obtained.

I claim:
1. A compound represented by the formula:

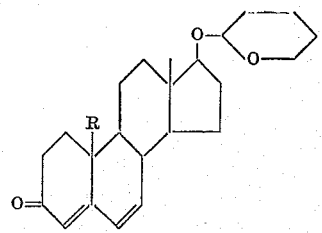

wherein R is selected from the group consisting of hydrogen and methyl.
2. The 17-tetrahydropyranyl ether of $\Delta^{4,6}$-androstadien-17β-ol-3-one.
3. The 17-tetrahydropyranyl ether of 19-nor-$\Delta^{4,6}$-androstadien-17β-ol-3-one.

References Cited in the file of this patent
Ruggieri et al.: "Gazz. Chim. Ital.," vol. 91, June 1961.
Manson et al.: "J. of Med. Chem.," vol 6, No. 1, Jan. 18, 1963.